(12) United States Patent
Rinholm et al.

(10) Patent No.: US 7,647,757 B2
(45) Date of Patent: Jan. 19, 2010

(54) AUXILIARY DRIVE SHAFT CONNECTION ON REEL MOWER CUTTING UNIT

(75) Inventors: Brent G. Rinholm, Fuquay-Varina, NC (US); Richard D. Thier, Juneau, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/098,871

(22) Filed: Apr. 7, 2008

(65) Prior Publication Data

US 2009/0249762 A1    Oct. 8, 2009

(51) Int. Cl.
*A01D 34/53*    (2006.01)

(52) U.S. Cl. ............................................... 56/249

(58) Field of Classification Search ............. 310/66, 310/40 R, 89, 64; 56/249, 249.5, 7, 11.5, 56/15.3, 11.6; 172/118, 40
See application file for complete search history.

(56) References Cited

U.S. PATENT DOCUMENTS

| | | | | |
|---|---|---|---|---|
| 1,947,117 | A * | 2/1934 | Stegeman et al. | ............ 56/11.5 |
| 2,197,264 | A * | 4/1940 | Cooper | ........................ 56/15.3 |
| 2,329,952 | A * | 9/1943 | Speiser | ....................... 56/11.6 |
| 2,603,055 | A | 7/1952 | Boyce et al. | |
| 3,685,469 | A | 8/1972 | Rogers | |
| 4,021,996 | A | 5/1977 | Bartlett et al. | |
| 4,481,757 | A | 11/1984 | Tsuchiya | |
| 5,682,735 | A | 11/1997 | Swenson et al. | |
| 5,896,734 | A * | 4/1999 | Chesack et al. | ................ 56/249 |
| 6,029,433 | A | 2/2000 | Westbrook et al. | |
| 6,467,245 | B1 * | 10/2002 | Humphrey | ................. 56/249.5 |
| 6,622,464 | B2 * | 9/2003 | Goman et al. | ................. 56/16.9 |
| 6,688,094 | B2 | 2/2004 | Berndt et al. | |
| 6,946,762 | B2 * | 9/2005 | Rinholm et al. | ............... 310/66 |
| 7,191,584 | B2 * | 3/2007 | Goman et al. | ................. 56/249 |
| 2002/0095922 | A1 * | 7/2002 | Goman et al. | ................ 56/16.7 |
| 2003/0145570 | A1 | 8/2003 | Berndt et al. | |
| 2006/0123761 | A1 * | 6/2006 | Goman et al. | ................. 56/156 |
| 2007/0227112 | A1 * | 10/2007 | Goman et al. | ................. 56/249 |

FOREIGN PATENT DOCUMENTS

| | | |
|---|---|---|
| GB | 1270093 | 4/1972 |
| GB | 2137062 | 10/1984 |

* cited by examiner

*Primary Examiner*—Árpád Fábián-Kovács (57) ABSTRACT

An auxiliary drive mounted to a reel mower cutting unit includes a cutting reel shaft rotated by a motor and having a horizontal axis, an auxiliary drive housing positioned adjacent the reel mower cutting unit and pivotable on the axis of the cutting reel shaft, an auxiliary drive input shaft engaged to the cutting reel shaft, and an auxiliary drive output shaft coaxially engaged to an end of an attachment outside the auxiliary drive housing by inserting one of the auxiliary drive output shaft and the attachment end through a collet and tightening a nut over the collet. A transverse pin in one of the output shaft and the attachment end may be engaged by a split end in the other of the output shaft and the attachment end.

10 Claims, 11 Drawing Sheets

AUXILIARY DRIVE SHAFT CONNECTION ON REEL MOWER CUTTING UNIT

FIELD OF THE INVENTION

This invention relates generally to auxiliary drives mounted to reel mower cutting units, and specifically to auxiliary drives for attachments such as a conditioner or roller power brush rotatably mounted on a reel mower cutting unit.

BACKGROUND OF THE INVENTION

Grass mowing machines with reel mower cutting units are used on golf courses and other turf areas that require grass to be cut very accurately. The cutting units are typically rolled across the surface of the ground by a powered vehicle. The cutting units include a generally cylindrical reel with a plurality of blades that rotate in close proximity to a stationary bedknife fixed with the frame of the cutting unit. Grass is cut by a shearing action between the bedknife and the rotation blades of the reel.

Attachments on reel mower cutting units may be used to improve the quality of the cut, performance, and other turf grooming features. The attachments, such as conditioners, roller power brushes, or turf grooming brushes may be rotated by auxiliary drives mounted to the reel mower cutting unit and powered by the shaft of the cutting reel. An auxiliary drive may transmit rotational power from the cutting reel shaft to the attachment through a set of gears or a belt on a pair of sprockets or pulleys.

A conditioner, for example, is an attachment used for finer grooming of turf areas such as putting greens, by reducing thatch, slicing stolons, controlling grain, and deflecting material away from the reel and bedknife. A conditioner may stand the grass up for an even, clean cut and truer putting green surface. A typical conditioner includes a number of (for example, 72) closely spaced vertical blades mounted on a horizontal shaft adjacent one of the rollers. The blades may have a diameter of between about 40 and 80 mm, and preferably between about 50 and 65 mm. A conditioner may be counter-rotated to the direction of travel of the cutting unit. An auxiliary drive, sometimes referred to as a conditioner drive, transmits rotational power from the cutting reel shaft to the conditioner. For example, a conditioner drive may include a set of gears that rotate the conditioner at speeds of about 2000 rpm.

A roller power brush is an attachment used to prevent accumulation of grass clippings and other debris on a roller supporting a reel mower cutting unit, so that the cutting unit can maintain a consistent effective height of cut. The brush may be rotatably mounted to the cutting unit above and adjacent the rear roller, for example. The brush may include radially extending bristles on a brush shaft. The brush may be rotated by an auxiliary drive opposite to the direction of travel of the reel mower cutting unit. For example, the auxiliary drive may be a belt drive that transmits rotational power from the cutting reel shaft to the brush through a belt on sprockets that turns the brush at a desired rotational speed.

The input shaft of an auxiliary drive may be connected to the shaft of the cutting reel, and the output shaft may be connected to the attachment. Disconnecting or re-connecting the attachment from an auxiliary drive output shaft is desirable if an attachment must be repaired or replaced. However, disconnecting or re-connecting the attachment from the auxiliary drive output shaft is a difficult task. The connection between the attachment and output shaft may be located inside the auxiliary drive housing. As a result, the auxiliary drive may need to be partially or completely disassembled. It is desirable to shorten and simplify disconnection or reconnection of an attachment from an auxiliary drive output shaft, and to permit adjusting the attachment's position or depth of engagement, while maintaining positive centering of the auxiliary drive output shaft with the attachment.

SUMMARY OF THE INVENTION

An auxiliary drive mounted to a reel mower cutting unit includes an auxiliary drive housing, an input shaft rotated by a reel shaft of the reel mower cutting unit and transmitting rotational power to an output shaft extending laterally from the housing. The auxiliary drive rotates an attachment having an end. One of the output shaft and the attachment end is inserted into the other and tightened with a nut to engage them together coaxially outside the auxiliary drive housing. A collet inserted into one of the output shaft and the attachment end grips the other.

The present invention shortens and simplifies disconnection or reconnection of an attachment from an auxiliary drive output shaft, permits adjusting the attachment's position or depth of engagement, and maintains positive centering of the auxiliary drive output shaft with the attachment.

DESCRIPTION OF THE PREFERRED EMBODIMENT

In the embodiment shown in FIGS. 1-8, reel mower cutting unit 100 has front and rear rollers 101, 102 that roll in contact with the ground and support the cutting unit during mowing operations. The reel mower cutting unit includes a generally cylindrical reel 134 having a plurality of blades on cutting reel shaft 104 to rotate about the cutting reel shaft's laterally extending horizontal axis. The cutting reel shaft may be rotated with electric motor 135 or, alternatively, by a hydraulic motor. As the blades rotate they pass in close proximity to bedknife 137 positioned between side panels 109, 110 of the cutting unit frame. The blades and bedknife interact to cut grass with a shearing action as the cutting unit is propelled forward. To adjust the cutting height, front and rear roller adjustment mechanisms 129, 130 may be used to raise and lower the front and rear rollers.

In the embodiment of FIGS. 1-6 and 8, two attachments are shown on reel mower cutting unit 100: conditioner 107 and roller power brush 103. Alternatively, one of the attachments may be a turf grooming brush 116 shown in FIG. 7. Each attachment is rotated by an auxiliary drive.

In one embodiment, conditioner 107 is an attachment mounted to reel mower cutting unit 100 between left and right side panels 109, 110. The conditioner includes a plurality of blades extending radially from a shaft having a first end 114 and second end 165. The conditioner may be rotated opposite to the direction of travel of the reel mower cutting unit, so that the counter-rotating blades can penetrate the turf surface and reduce thatch, grain and stolons.

In one embodiment, conditioner drive 126 includes housing 127 mounted to side panel 110 of the reel mower cutting unit. The conditioner drive is an auxiliary drive unit that transmits rotational power from cutting reel shaft 104 to conditioner 107. The conditioner drive housing encloses a plurality of gears between conditioner drive input shaft 139 and conditioner drive output shaft 140. For example, the conditioner drive may house gears 154, 155, 156 rotatably engaged between the conditioner drive input and output shafts. Inside the conditioner drive housing, gear 154 may be mounted to input shaft 139, which engages gear 155, which engages gear 156 mounted to output shaft 140. The conditioner drive input and output shafts may be parallel to each other.

In one embodiment, conditioner drive housing 127 is mounted to reel mower cutting unit 100 with retaining clip 144. The retaining clip allows adjusting the depth of engagement of conditioner 107 with the turf, while maintaining positive centering of conditioner drive input and output shafts 139, 140 on cutting reel shaft 104 and conditioner shaft 114 respectively. For example, the first, externally splined end of conditioner drive input shaft 139 releasably engages the internally splined end 112 of cutting reel shaft 104, and is coaxial with the reel shaft.

In one embodiment, retaining clip 144 engages conditioner drive housing 127 and boss 142 on the side panel of the reel mower. The retaining clip prevents axial separation of the conditioner drive input and output shafts from the reel shaft and conditioner shaft, while permitting the conditioner drive housing to pivot on the reel shaft axis. The retaining clip may hold the conditioner drive housing against the side panel while allowing the conditioner drive housing to pivot sufficiently to move to various different conditioner height settings. The choice of height settings may depend, for example, on the diameter of the conditioner blades.

In one embodiment, retaining clip 144 may be a U-shaped wire form having a pair of preferably parallel legs. Alternatively, the retaining clip may be one or more pins or rods that engage the conditioner drive housing and the side panel of the reel mower cutting unit, while permitting the conditioner drive housing to pivot on the cutting reel axis. If the retaining clip includes two or more parts, the parts may be parallel or non-parallel.

In one embodiment, a plurality of holes 145 are provided in flange 141 of the conditioner drive housing. Each hole extends from the outer diameter of flange 141, through the flange to the internal diameter of the flange, and then from the internal diameter back through to its outer diameter. Retaining clip 144 may be inserted through the holes, so that a portion of each retaining clip passes through the internal diameter of the flange. Flange 141 may have an internal diameter that fits snugly on boss 142 on side panel 110, but can pivot on the boss. When flange 141 is positioned on boss 142, retaining clip may be inserted through the holes so that the portion of the retaining clip that passes through the flange's internal diameter captures groove 143 or slot in the outer perimeter of boss 142. For example, the retaining clip may be a one-piece U-shaped wire form having a pair of legs that are spaced apart less than the internal diameter of flange 141, so that the legs of the clip can enter and capture groove 143 in boss 142.

Alternatively, the holes may be provided in a boss on the side panel of the cutting unit, and the groove may be provided in the flange of the conditioner drive housing. A retaining clip may be inserted through holes in the boss on the side panel of the cutting unit, and into a groove or slot in a flange portion of the conditioner drive housing. The retaining clip may axially retain the conditioner drive input shaft to the reel shaft, but allow the conditioner drive housing to pivot with respect to the reel mower cutting unit for adjusting the conditioner's depth of engagement.

In one embodiment, an attachment, such as conditioner 107, may be quickly attached or detached from the output shaft of an auxiliary drive, such as a conditioner drive, without opening or disassembling the auxiliary drive. The connection between the auxiliary drive output shaft and the attachment is external to the auxiliary drive.

Figure 1:
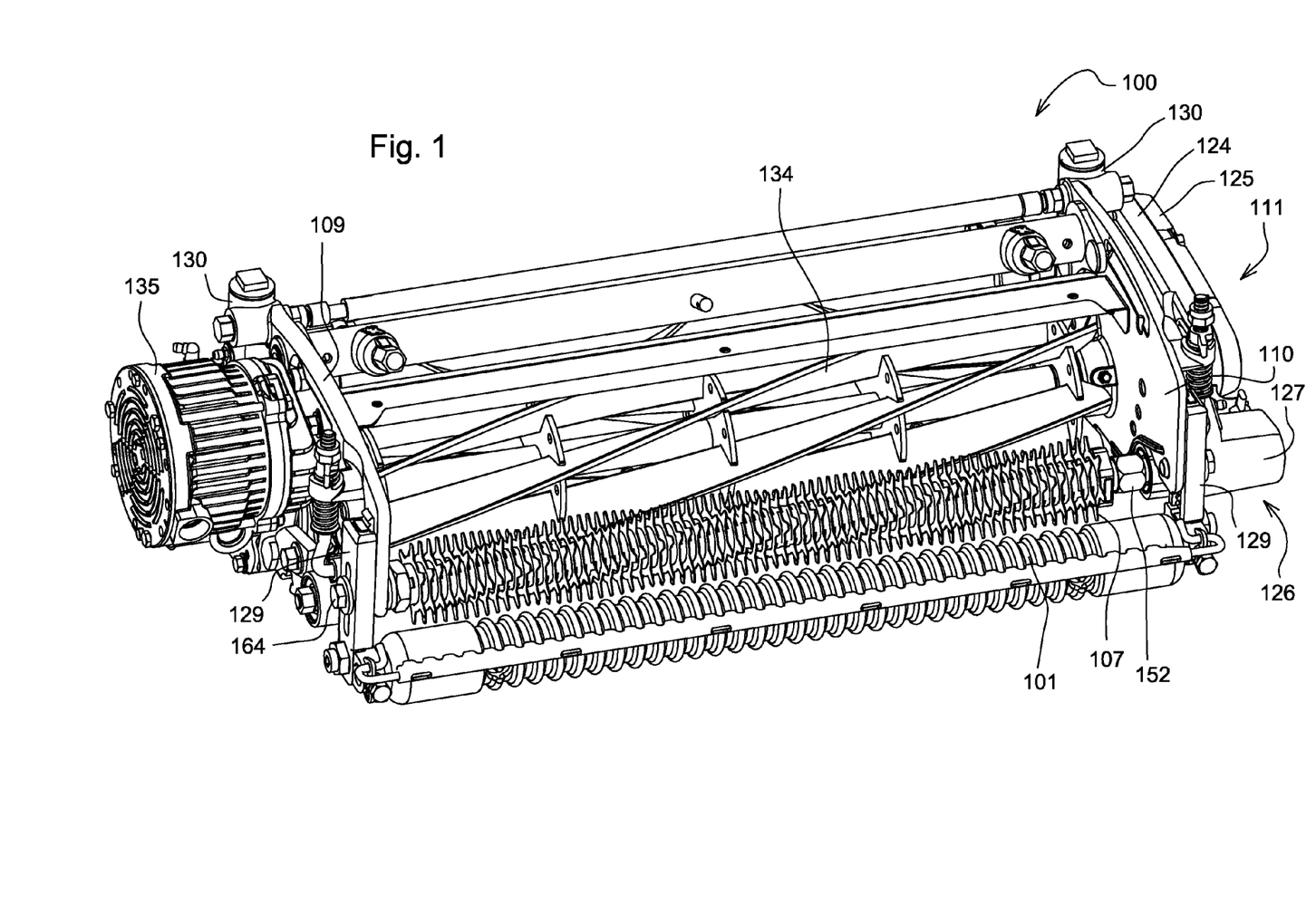
FIG. 1 is a rear perspective view of a reel mower cutting unit with auxiliary drives mounted to the cutting unit for a conditioner and a roller power brush according to a first embodiment of the invention.
Figure 2:
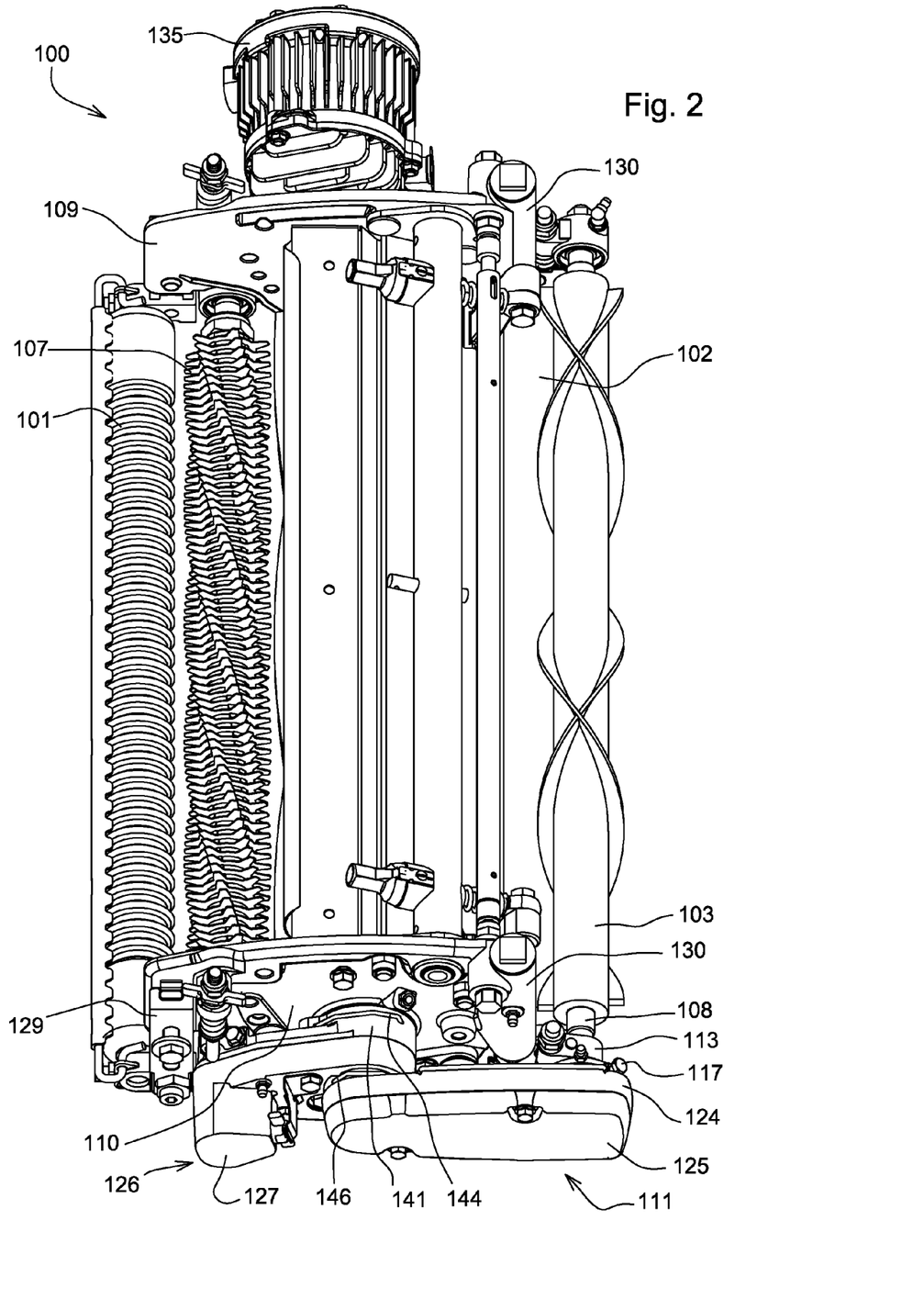
FIG. 2 is a top perspective view of a reel mower cutting unit with auxiliary drives mounted to the cutting unit for a conditioner and a roller power brush according to a first embodiment of the invention.
Figure 3:
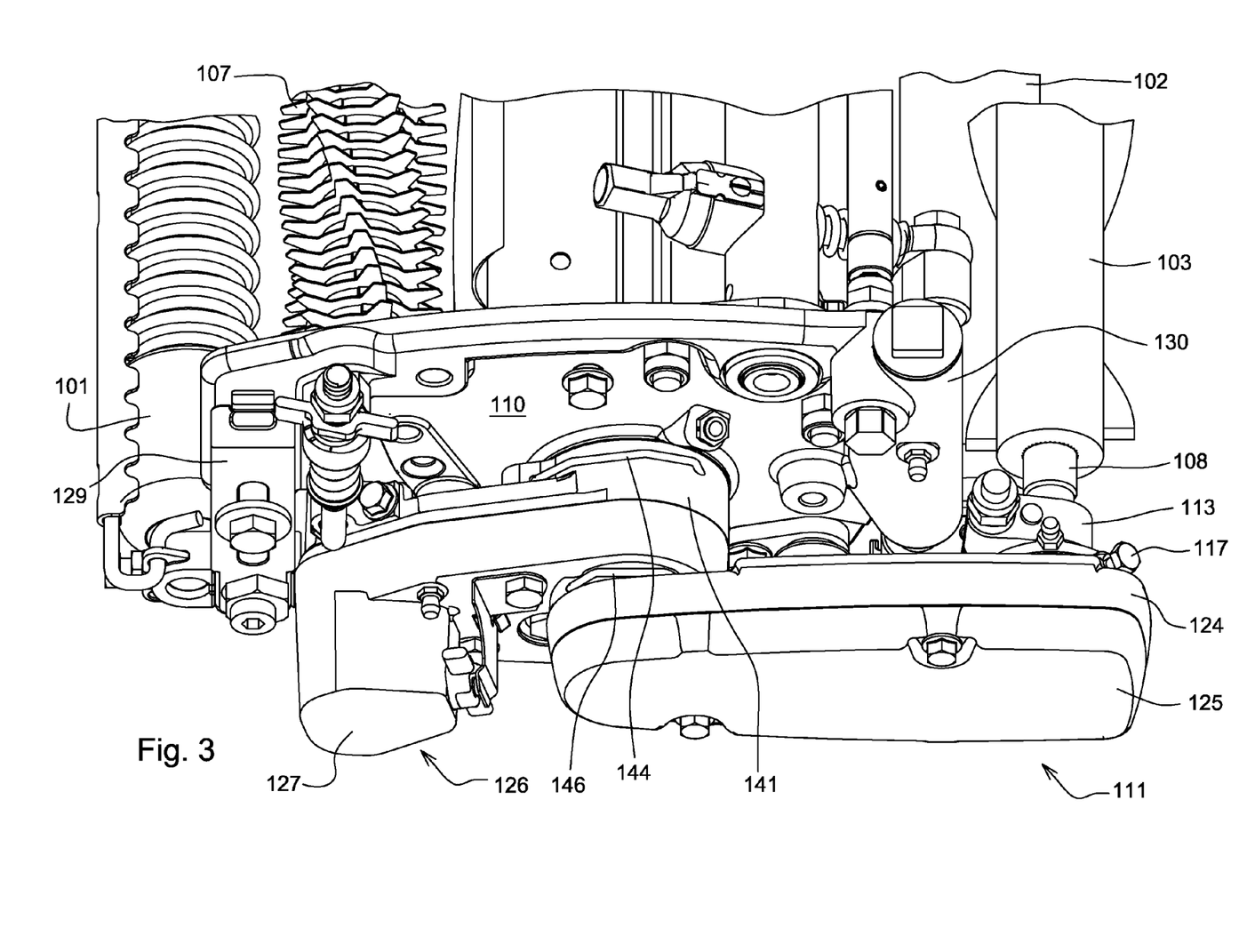
FIG. 3 is a top perspective view of auxiliary drives for a conditioner and a roller power brush in a first embodiment of the invention.
Figure 4:
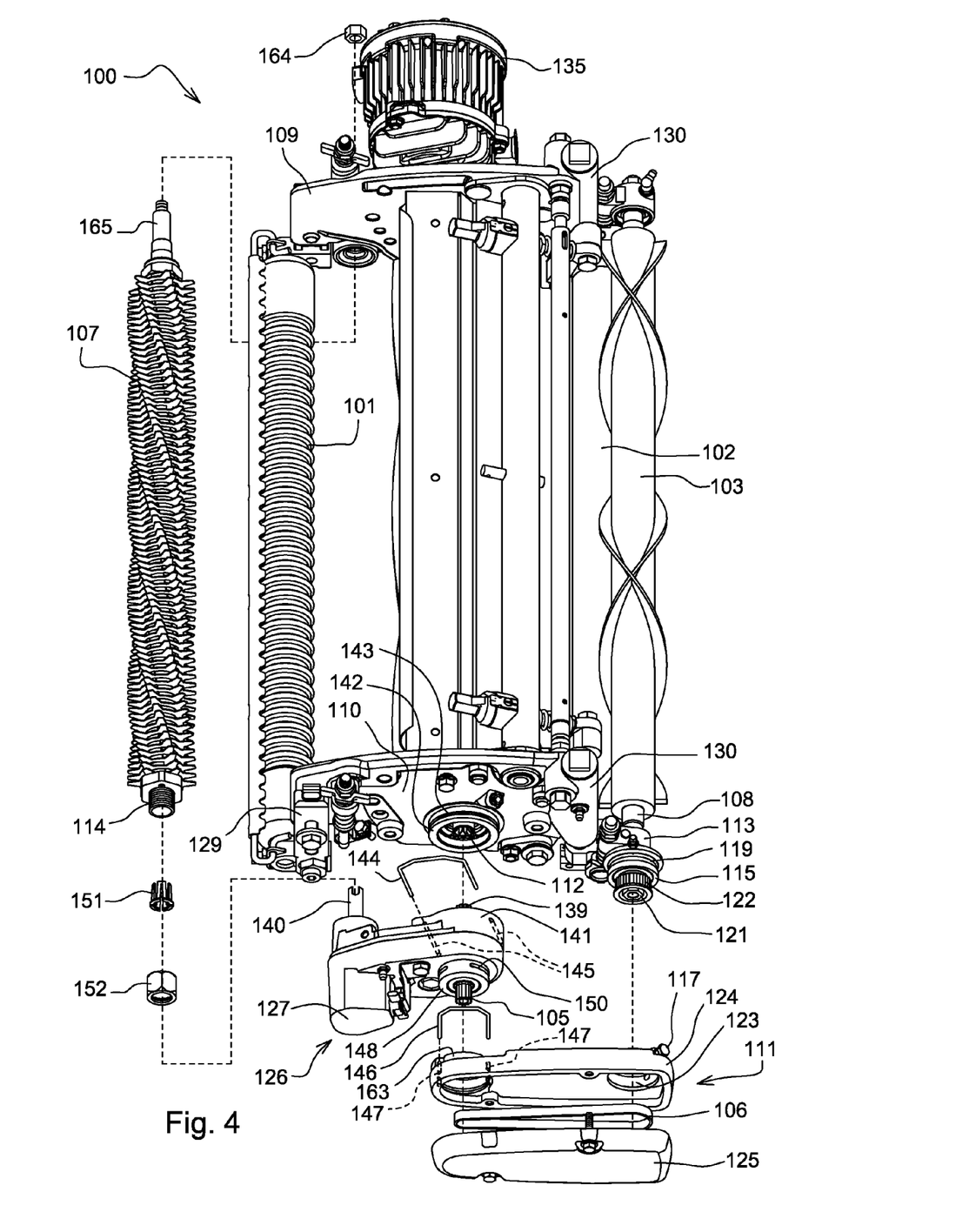
FIG. 4 is a partially exploded top perspective view of a reel mower cutting unit with auxiliary drives for a conditioner and a roller power brush according to a first embodiment of the invention.
Figure 5A:
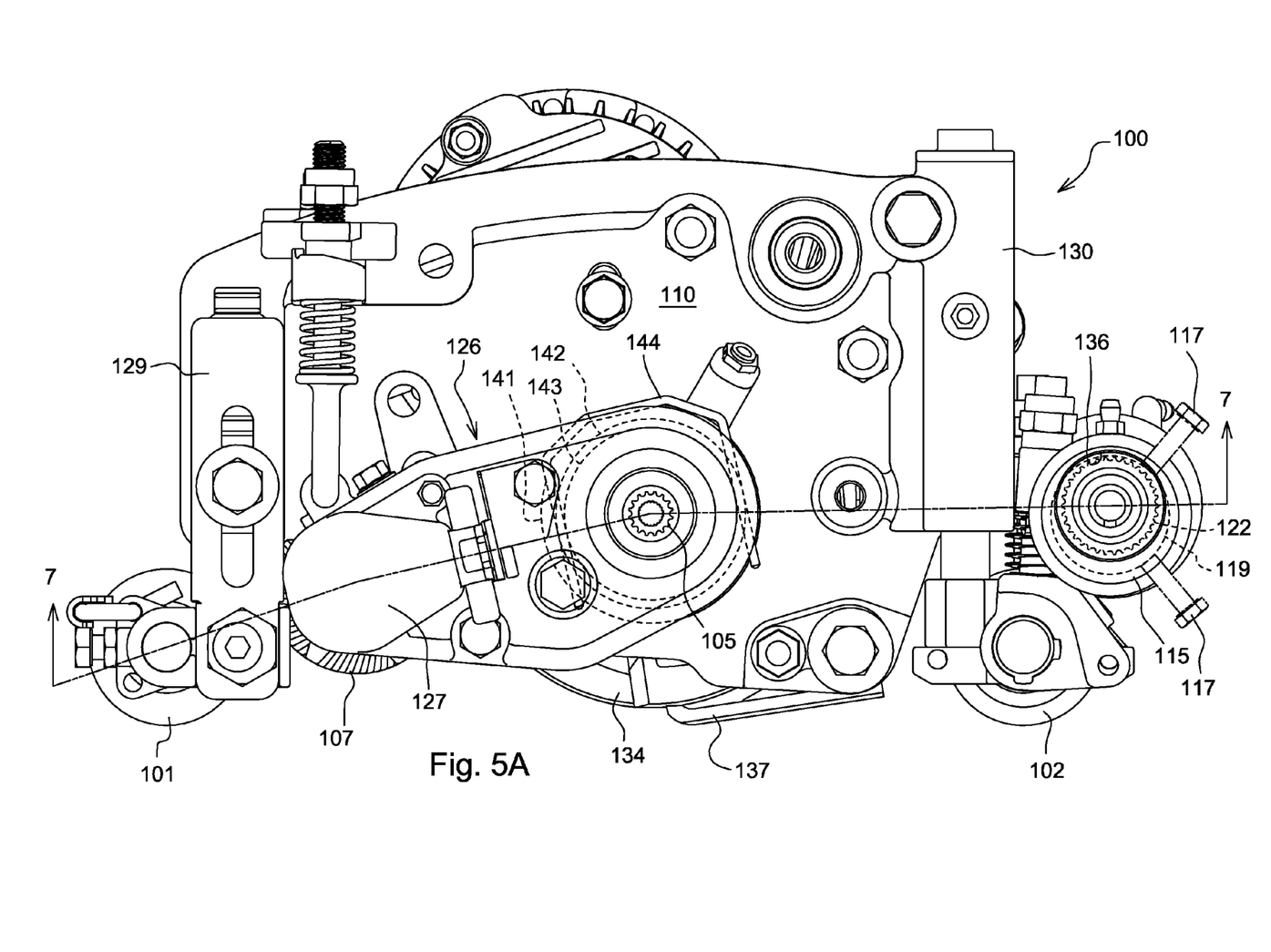
FIG. 5A is a side view of a reel mower cutting unit with an auxiliary drive for a conditioner mounted to the cutting unit, and the auxiliary drive pivoted to raise the conditioner, according to a first embodiment of the invention.
Figure 5B:
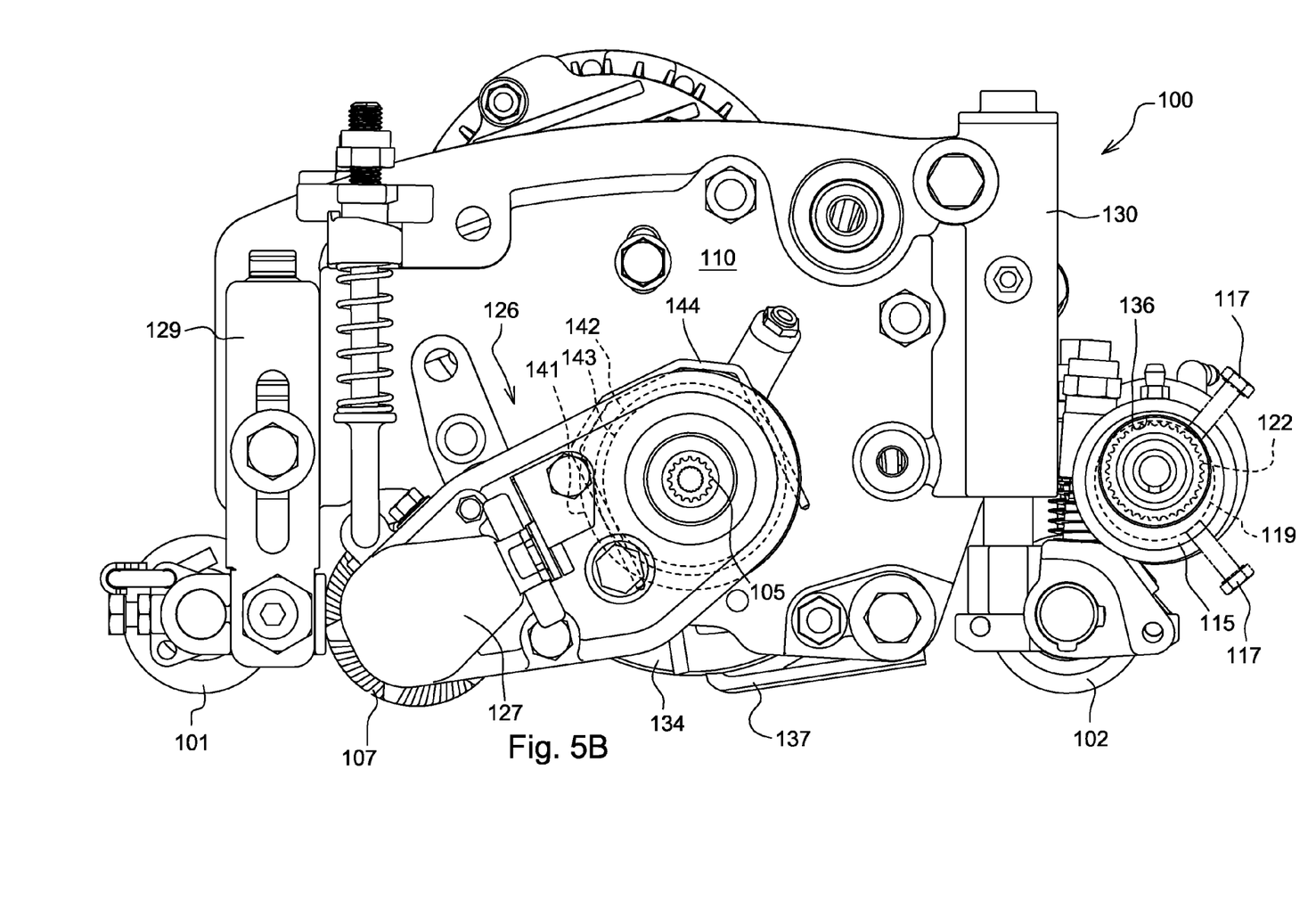
FIG. 5B is a side view of a reel mower cutting unit with an auxiliary drive for a conditioner mounted to the cutting unit, and the auxiliary drive pivoted to lower the conditioner, according to a first embodiment of the invention.
Figure 5C:
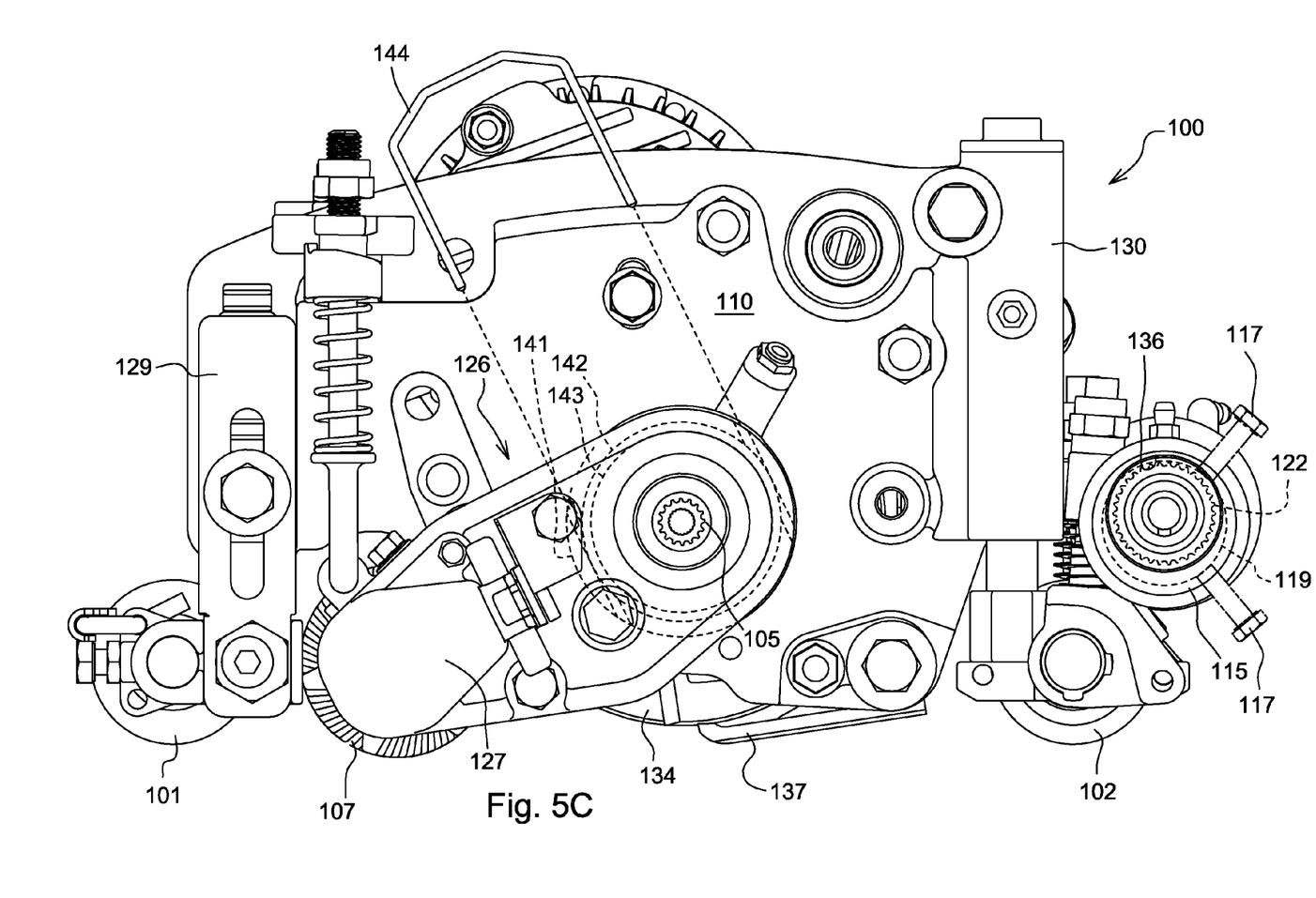
FIG. 5C is a side view of a reel mower cutting unit with an auxiliary drive for a conditioner mounted to the cutting unit, and the retaining clip removed, according to a first embodiment of the invention.
Figure 6A:
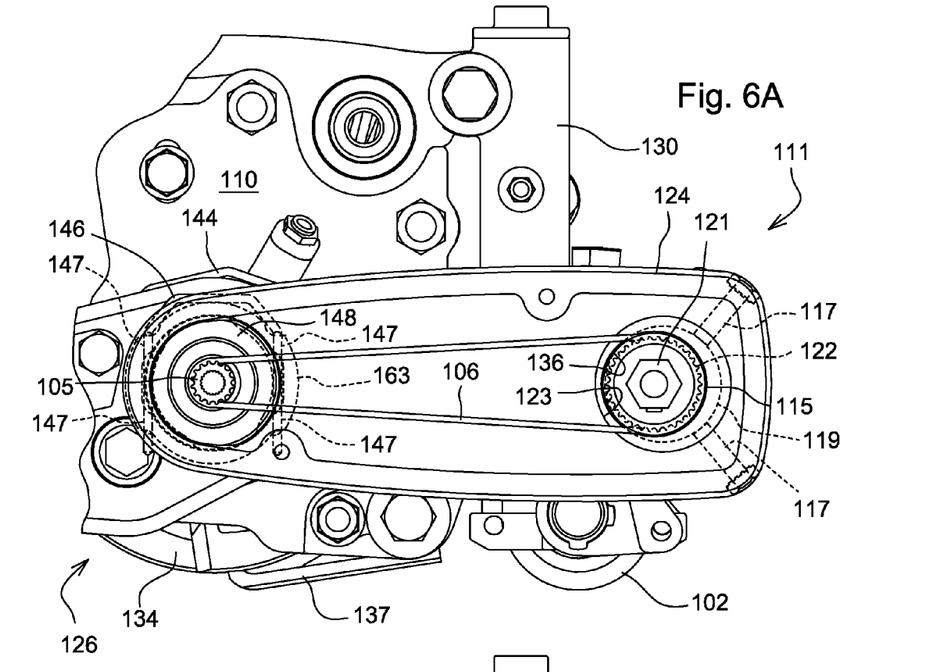
FIG. 6A is a side view of an auxiliary drive for a roller power brush mounted to a reel mower cutting unit, with the eccentric bearing housing for the belt drive in a first position, according to a first embodiment of the invention.
Figure 6B:
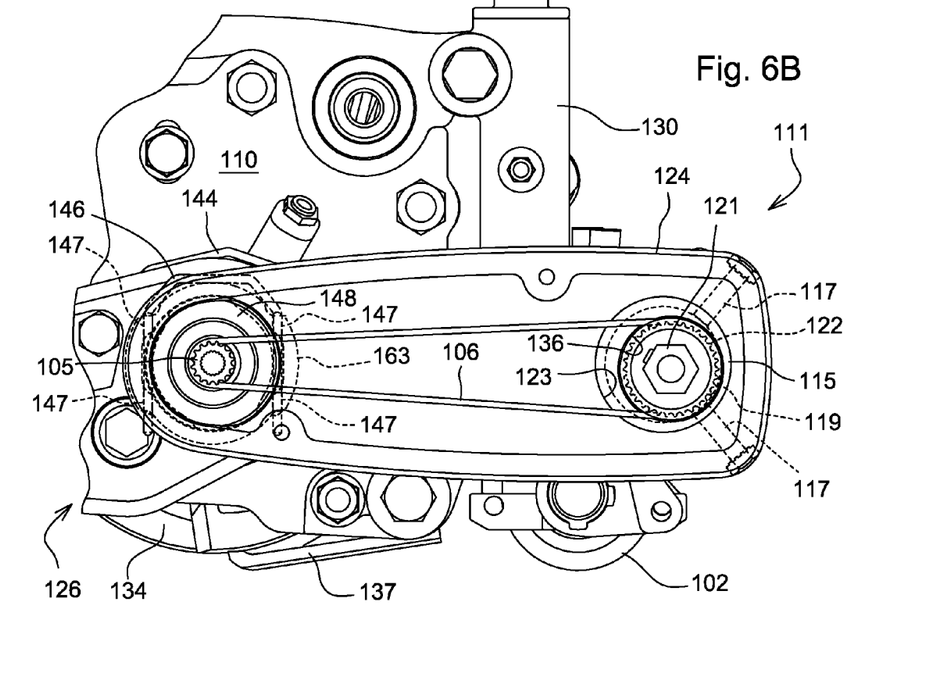
FIG. 6B is a side view of an auxiliary drive for a roller power brush mounted to a reel mower cutting unit, with the eccentric bearing housing for the belt drive in a second position, according to a first embodiment of the invention.
Figure 6C:
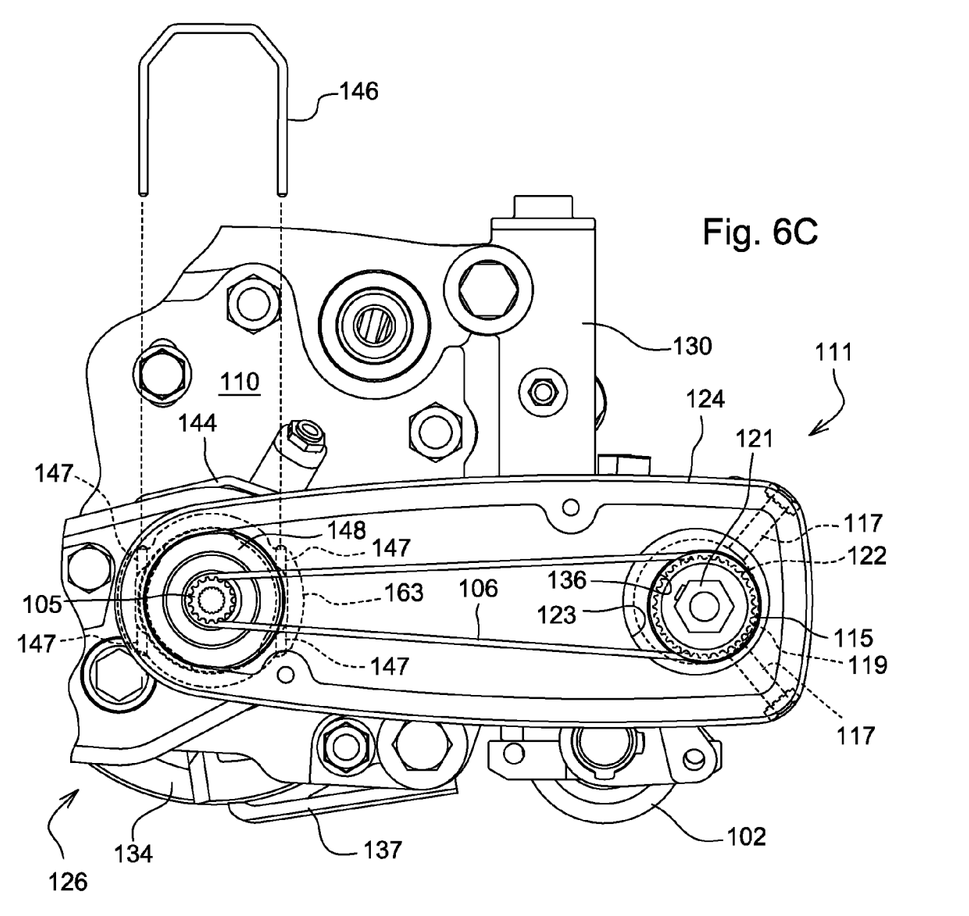
FIG. 6C is a side view of an auxiliary drive for a roller power brush mounted to a reel mower cutting unit, and with the retaining clip removed, according to a first embodiment of the invention.
Figure 7:
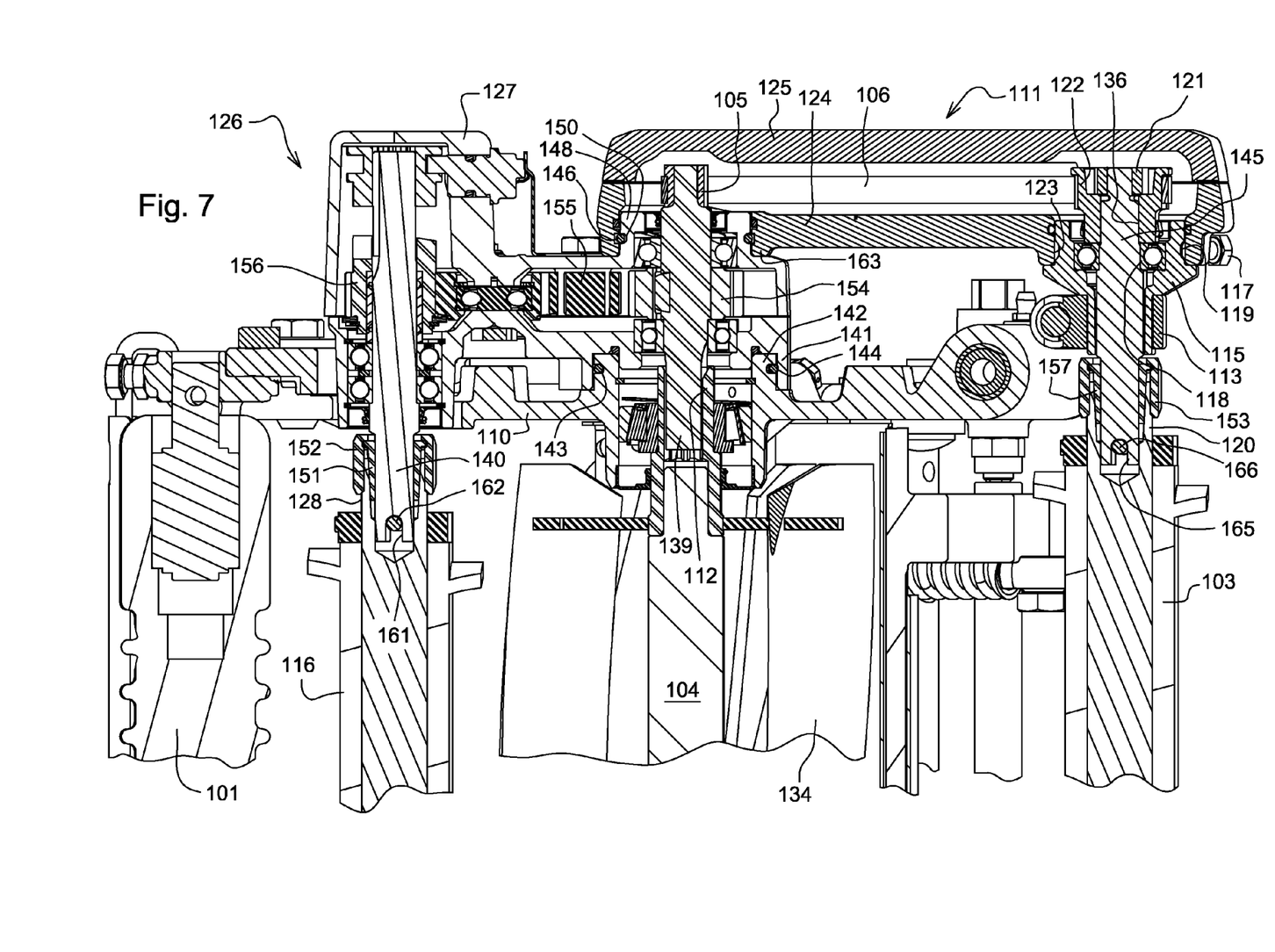
FIG. 7 is a cross sectional view of auxiliary drives for a turf grooming brush and a roller power brush mounted to a reel mower cutting unit according to a first embodiment of the invention.
Figure 8:
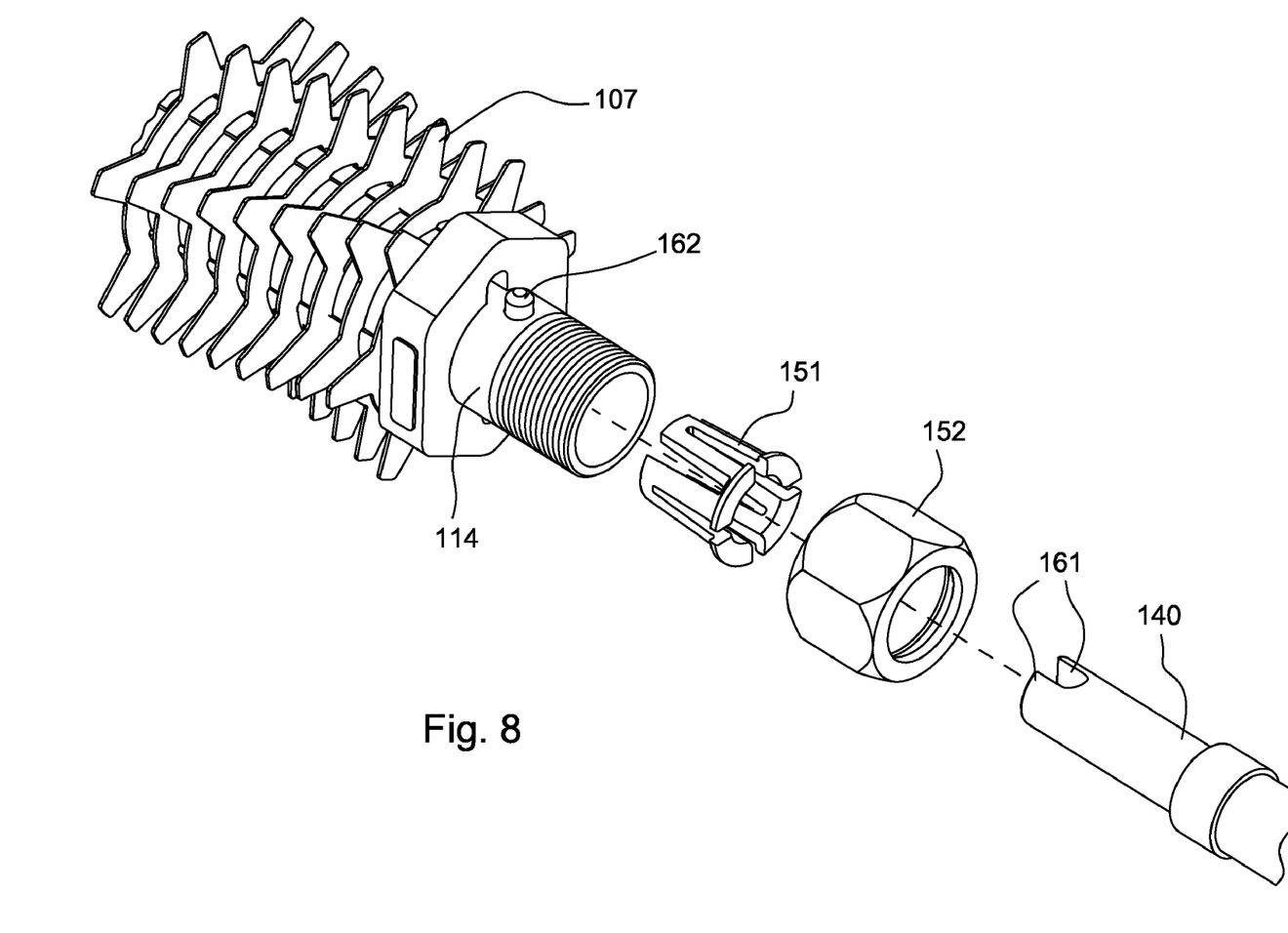
FIG. 8 is an exploded perspective view of a conditioner drive output shaft engageable to the end of a conditioner according to a first embodiment of the invention.

In one embodiment, conditioner 107, roller power brush 103, or turf grooming brush 116 has a hollow or tubular first end 114, 120 or 128. Collet 151 or 157 is inserted into the first end of the conditioner or brush. Then, conditioner drive output shaft 140, which extends from conditioner drive 126, or output shaft 145 extending from auxiliary drive 111, is inserted through collet 151 or 157 into the first end. The collet aligns the output shaft into the first end of the conditioner or brush. Output shaft 140 or 145 has a split end 161 or 153 that engages transverse pin 162 or 166. The first end of the conditioner or brush is externally threaded, and nut 152 or 153 is threaded onto it. Nut 152 or 153 has a rim that tightens the collet radially against the output shaft. To disengage the conditioner or brush from conditioner drive 126 or auxiliary drive 111, nut 152 or 153 may be loosened from the first end of the conditioner or brush. Conditioner 107 or brush then may be removed from the reel mower cutting unit by removing the drive housing and loosening nut 164 from the second end 165 of the conditioner or brush.

Alternatively, the conditioner or auxiliary drive output shaft may be hollow and externally threaded. The first end of the conditioner or brush may be inserted through a collet in the output shaft and tightened with a nut having a rim that urges the collet to grip the shaft inside the collet. The conditioner or auxiliary drive output shaft is coaxially engaged to the conditioner or brush outside the conditioner or auxiliary drive housing.

In one embodiment, roller power brush 103 is an attachment mounted to reel mower cutting unit 100 above and adjacent rear roller 102. The roller power brush includes radially extending bristles fixed to brush shaft 108. The brush may be rotated by an auxiliary drive, or belt drive, opposite to the direction of travel of the reel mower cutting unit, so that the brush can remove grass clippings and debris from the rear roller during mowing operations.

In one embodiment, belt drive 111 is an auxiliary drive unit mounted to cutting unit 100 and/or to conditioner drive 126. The belt drive transmits rotational power from cutting reel shaft 104 and/or input shaft 139, to output shaft 108 which may be the brush shaft. The belt drive may include endless belt 106 around input sprocket 105 on the input shaft and output sprocket 122 on the output shaft. The belt drive input sprocket may be mounted on the same input shaft 139 as the conditioner drive input shaft extending through the conditioner drive. The belt may be enclosed within belt drive housing 124 and housing cover 125.

In one embodiment, belt drive housing 124 may be mounted to conditioner drive 126 and/or reel mower cutting unit 100 with retaining clip 146. The retaining clip allows adjusting the spacing of brush 103 with respect to rear roller 102, while maintaining positive centering of the belt drive with input shaft 139 and brush shaft 108.

In one embodiment, retaining clip 146 engages belt drive housing 124 and boss 148 on the conditioner drive. The retaining clip prevents axial separation of the belt drive from input shaft 139, while permitting the belt drive housing to pivot on the input shaft or reel shaft axis. The retaining clip may hold the belt drive housing against the conditioner drive housing and/or cutting unit while allowing the belt drive to pivot sufficiently to move to various different brush height settings with respect to the rear roller. The choice of height settings may depend, for example, on the condition or length of the brush bristles.

In one embodiment, retaining clip 146 may be a U-shaped wire form having a pair of preferably parallel legs. Alternatively, the retaining clip may be one or more pins or rods that engage the belt drive housing and conditioner drive housing or side panel of the reel mower cutting unit, while permitting the belt drive housing to pivot on the cutting reel axis. If the retaining clip includes two or more parts, the parts may be parallel or non-parallel.

In one embodiment, a plurality of holes 147 are located in flange 163 on the belt drive housing. Each hole extends from the outer diameter of flange 163, through the flange to an internal diameter of the flange, and then from the internal diameter back to the outer diameter. Flange 163 may have an internal diameter that fits snugly on boss 148 on conditioner drive housing 127, but can pivot on the boss. When flange 163 is positioned on boss 148, retaining clip may be inserted through the holes so that a portion of the retaining clip passes through the internal diameter of the flange and captures groove 150 or slot in the outer perimeter of boss 148. For example, the retaining clip may be a one-piece U-shaped wire form having a pair of legs that are spaced apart less than the internal diameter of flange 163, so that the legs of the clip can enter and capture groove 150 in boss 148.

Alternatively, the holes may be provided in a boss on the side panel of the conditioner drive housing, and the groove may be provided in the flange of the belt drive housing. A retaining clip may be inserted through holes in the boss on the conditioner drive housing, and into a groove or slot in a flange portion of the belt drive housing. The retaining clip may axially retain the belt drive to input shaft 139, but allow the belt drive housing to pivot with respect to the reel mower cutting unit for adjusting the brush's relationship to the rear roller.

In one embodiment, a belt tensioning system may be used to tighten the belt of auxiliary belt drive 111, if the belt stretches due to wear or adverse conditions. The belt tensioning system may be used to ensure proper engagement between the belt and sprockets 105, 122 on the input and output shafts of a belt drive.

In one embodiment, the belt tensioning system includes eccentric bearing housing 115. The eccentric bearing housing may be mounted in opening 123 in belt drive housing 124. While the eccentric bearing housing remains mounted within opening 123 in the belt drive housing, an operator may manually pivot the eccentric bearing housing to change its orientation and adjust the belt tension.

In one embodiment, the eccentric bearing housing has an internal bore 136 that is offset at least about 5 mm from the center of the eccentric bearing housing. The bore is provided with bearings 118. The output shaft of the auxiliary drive, which may be brush shaft 108, may be inserted into and through bore 136. Sprocket 122 is mounted to the end of output or brush shaft 108 and may be tightened with nut 121.

Pivoting the eccentric bearing housing shifts the axis of the output shaft for the auxiliary drive, or brush shaft 108, thereby changing tension of belt 106. More specifically, pivoting the eccentric bearing housing moves the output shaft for the auxiliary drive closer to or further from input shaft 139. As a result, the belt tension may be modified to compensate for any stretching of the belt.

Additionally, in one embodiment, one or more tightening bolts 117 may engage the outer diameter of eccentric bearing housing 115 to hold the eccentric bearing housing at a desired orientation or position. The tightening bolts may be inserted through the belt drive housing 124 to engage a groove 119 in the outer diameter of the eccentric bearing housing.

Having described a preferred embodiment, it will become apparent that various modifications can be made without departing from the scope of the invention as defined in the accompanying claims.

The invention claimed is:

1. An auxiliary drive mounted to a reel mower cutting unit, comprising:
    an auxiliary drive housing enclosing an input shaft rotated by a reel shaft of the reel mower cutting unit and transmitting rotational power to an output shaft parallel to the input shaft and extending laterally from the housing; and
    an attachment having an end; one of the output shaft and the attachment end inserted into the other and tightened with a nut to connect the output shaft and attachment end together coaxially outside the auxiliary drive housing.

2. The auxiliary drive of claim 1 further comprising a collet inserted into one of the output shaft and attachment end.

3. The auxiliary drive of claim 1 wherein one of the output shaft and attachment end has a transverse pin and the other has a split end engaging the transverse pin.

4. An auxiliary drive mounted to a reel mower cutting unit, comprising:
- an auxiliary drive housing, an input shaft rotated by a reel shaft of the reel mower cutting unit and transmitting rotational power to an output shaft extending laterally from the housing;
- an attachment having an end; one of the output shaft and the attachment end inserted into the other and tightened with a nut to connect the output shaft and attachment end together coaxially outside the auxiliary drive housing;
- a plurality of gears in the auxiliary drive housing between the input shaft and the output shaft.

5. The auxiliary drive of claim 1 wherein the attachment end is hollow and into which the output shaft is inserted.

6. An auxiliary drive mounted to a reel mower cutting unit, comprising:
- an auxiliary drive housing, an input shaft rotated by a reel shaft of the reel mower cutting unit and transmitting rotational power to an output shaft extending laterally from the housing; and
- an attachment having an end; one of the output shaft and the attachment end inserted into the other and tightened with a nut to connect the output shaft and attachment end together coaxially outside the auxiliary drive housing;
- wherein the attachment is a conditioner having a plurality of radially extending blades.

7. An auxiliary drive mounted to a reel mower cutting unit, comprising:
- a cutting reel shaft rotated by a motor and having a horizontal axis;
- an auxiliary drive housing positioned adjacent the reel mower cutting unit and pivotable on the axis of the cutting reel shaft;
- an auxiliary drive input shaft engaged to the cutting reel shaft and transmitting power through a plurality of gears to an auxiliary drive output shaft; and
- the auxiliary drive output shaft coaxially engaged to an end of an attachment outside the auxiliary drive housing by inserting one of the auxiliary drive output shaft and the attachment end through a collet and tightening a nut over the collet.

8. The auxiliary drive of claim 7 further comprising a transverse pin in one of the output shaft and the attachment end, the transverse pin engaged by a split end in the other of the output shaft and the attachment end.

9. An auxiliary drive mounted to a reel mower cutting unit, comprising:
- a cutting reel shaft rotated by a motor and having a horizontal axis;
- an auxiliary drive housing positioned adjacent the reel mower cutting unit and pivotable on the axis of the cutting reel shaft; and
- an auxiliary drive input shaft engaged to the cutting reel shaft; and
- an auxiliary drive output shaft coaxially engaged to an end of an attachment outside the auxiliary drive housing by inserting one of the auxiliary drive output shaft and the attachment end through a collet and tightening a nut over the collet;
- wherein the attachment is a conditioner having a plurality of radially extending blades.

10. An auxiliary drive mounted to a reel mower cutting unit, comprising:
- a cutting reel shaft rotated by a motor and having a horizontal axis;
- an auxiliary drive housing positioned adjacent the reel mower cutting unit and pivotable on the axis of the cutting reel shaft; and
- an auxiliary drive input shaft engaged to the cutting reel shaft; and
- an auxiliary drive output shaft coaxially engaged to an end of an attachment outside the auxiliary drive housing by inserting one of the auxiliary drive output shaft and the attachment end through a collet and tightening a nut over the collet;
- wherein the attachment is a turf grooming brush.

* * * * *